M. T. Williams,
Egg-Beater.
N°64,928.　　　　　Patented May 21, 1867.
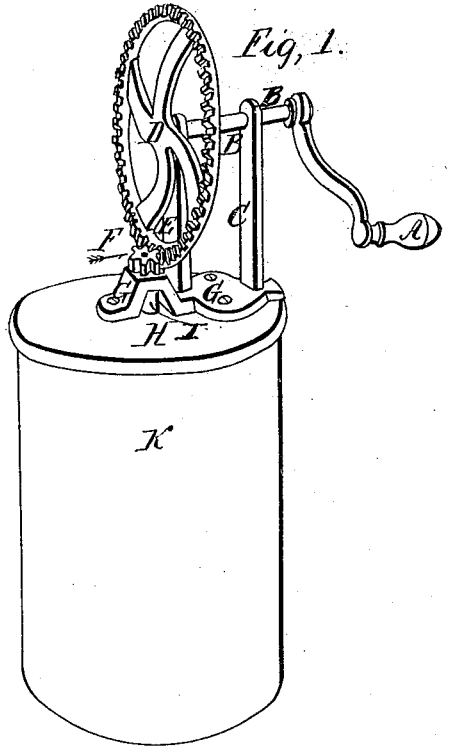
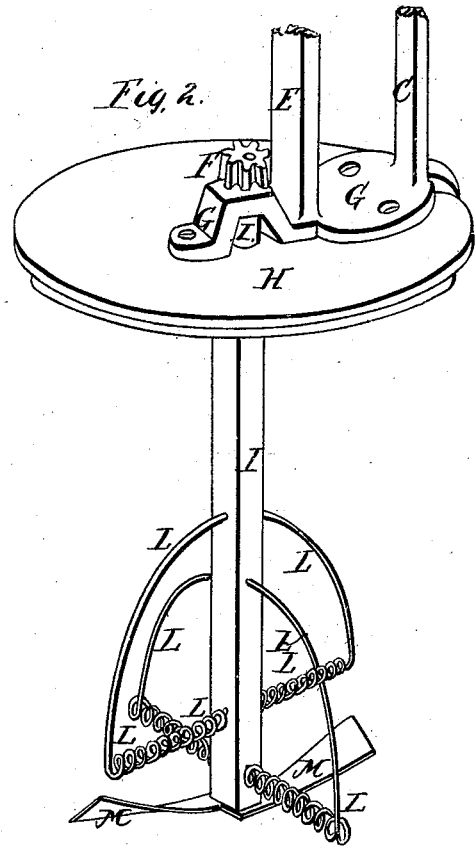
Witnesses:　　　　　　　　　Inventor;

United States Patent Office.

MARVIN T. WILLIAMS, OF MILWAUKEE, WISCONSIN.

Letters Patent No. 64,928, dated May 21, 1867.

IMPROVED EGG-BEATER.

*The Schedule referred to in these Letters Patent and making part of the same.*

TO ALL WHOM IT MAY CONCERN:

Be it known that I, MARVIN T. WILLIAMS, of the city and county of Milwaukee, and State of Wisconsin, have invented a new and improved Machine for Beating or Mixing Eggs; and I do hereby declare that the following is a full, clear, and exact description thereof, which will enable those skilled in the art to make and use the same, reference being had to the accompanying drawings, forming part of this specification, in which—

Figure 1 is a perspective view.

Figure 2 is a view of the beating apparatus.

Similar letters of reference in each of the figures indicate corresponding parts.

The object of this invention is to beat eggs or mix thoroughly the white and yolk for culinary or other purposes, without breaking or tearing the fibre.

A is the crank by which the machine is operated; B the crank-shaft; C E and G the frame attached to cover; H D, cog-wheel on crank-shaft B; F, pinion operated by cog-wheel D; H, cover; I, shaft on the head of which is pinion F, and to which are attached the beating arms; K, egg-holder or case of the beater; L, beating arms; M, propeller blades, which, when shaft I is turned, throw the eggs upward to be struck and beaten by the arms L.

Operation: Turn crank A, which puts pinion F and shaft I in motion. The propeller blades M throw the eggs upward, when they are beaten by arms L in a very few minutes. There are two motions, a lifting and a revolving motion. The eggs are first thrown upward, arms L strike and mix them, gravitation causes them to fall below the arms, when the blades M throw them up again.

What I claim as my invention, and desire to secure by Letters Patent, is—

Propeller blades M, beating arms L, shaft I, pinion F, cover H, and cog-wheel D, arranged and combined substantially as and for the purpose described.

MARVIN T. WILLIAMS.

Witnesses:
    J. B. SMITH,
    PERCY B. SMITH.